(12) United States Patent
Gammel et al.

(10) Patent No.: US 10,560,390 B2
(45) Date of Patent: Feb. 11, 2020

(54) TIME-BASED NETWORK OPERATION PROFILES IN A SOFTWARE-DEFINED NETWORK

(71) Applicant: Schweitzer Engineering Laboratories, Inc., Pullman, WA (US)

(72) Inventors: Dennis Gammel, Pullman, WA (US); Rhett Smith, Odessa, FL (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 10 days.

(21) Appl. No.: 15/911,344

(22) Filed: Mar. 5, 2018

(65) Prior Publication Data

US 2019/0273691 A1 Sep. 5, 2019

(51) Int. Cl.
 *H04L 12/841* (2013.01)
 *H04L 12/721* (2013.01)
 (Continued)

(52) U.S. Cl.
 CPC ........ *H04L 47/283* (2013.01); *H04L 41/0813* (2013.01); *H04L 43/04* (2013.01); *H04L 45/38* (2013.01); *H04L 45/64* (2013.01)

(58) Field of Classification Search
 CPC ... H04L 41/0813; H04L 43/04; H04L 45/021; H04L 45/38; H04L 45/64; H04L 47/283; H04L 63/0227; H04L 63/0263
 See application file for complete search history.

(56) References Cited

U.S. PATENT DOCUMENTS

| 7,710,999 B2* | 5/2010 | Bolder | G06Q 10/109 370/465 |
| 8,824,274 B1* | 9/2014 | Medved | H04L 41/12 370/217 |

(Continued)

FOREIGN PATENT DOCUMENTS

| CN | 203376828 | 1/2014 |
| CN | 106301952 | 1/2017 |

(Continued)

OTHER PUBLICATIONS

Mizrahi et al., Time-based Updates in OpenFlow: A Proposed Extension to the OpenFlow Protocol, Jul. 7, 2013, CCIT Report #835, Jul. 2013, EE Pub No. 1792, Technion, Israel (Year: 2013).*

(Continued)

*Primary Examiner* — Eric Nowlin
(74) *Attorney, Agent, or Firm* — Justin K. Flanagan

(57) ABSTRACT

A software-defined network controller (SDN controller) defines a first network flow to be selectively implemented by a networking device according to a first network operation profile. The SDN controller defines a second network flow to be selectively implemented by the networking device according to a second network operation profile. The first and second network operation profiles are stored within a memory of the networking device to be selectively implemented during different time periods based on a precision time input via a precision time input port on the networking device. In some embodiments, the networking device may detect a network event and implement a network operation profile for a preset time period based on the precision time input.

21 Claims, 11 Drawing Sheets

(51) Int. Cl.
*H04L 12/715* (2013.01)
*H04L 12/26* (2006.01)
*H04L 12/24* (2006.01)

(56) References Cited

U.S. PATENT DOCUMENTS

| | | | |
|---|---|---|---|
| 9,047,143 | B2 | 6/2015 | Pruss et al. |
| 9,124,485 | B2 | 9/2015 | Heron et al. |
| 9,137,140 | B2 | 9/2015 | Tao et al. |
| 9,258,212 | B2 | 2/2016 | Pfeifer et al. |
| 9,258,315 | B2 | 2/2016 | Martin |
| 9,270,754 | B2 | 2/2016 | Iyengar et al. |
| 9,276,827 | B2 | 3/2016 | Voit et al. |
| 9,282,164 | B2 | 3/2016 | Finn et al. |
| 9,330,156 | B2 | 5/2016 | Satapathy |
| 9,356,871 | B2 | 5/2016 | Medved et al. |
| 9,392,050 | B2 | 7/2016 | Voit et al. |
| 9,467,536 | B1 | 10/2016 | Kanekar et al. |
| 9,503,363 | B2 | 11/2016 | Sivabalan et al. |
| 9,596,141 | B2 | 3/2017 | McDowall |
| 10,142,372 | B2 * | 11/2018 | Rogers .......... H04L 63/0236 |
| 10,313,238 | B2 * | 6/2019 | Hayashi .......... H04L 12/66 |
| 10,313,375 | B2 * | 6/2019 | Lin .............. H04L 63/1458 |
| 2002/0144156 | A1 | 10/2002 | Copeland |
| 2007/0280239 | A1 | 12/2007 | Lund |
| 2008/0095059 | A1 * | 4/2008 | Chu .............. H04L 12/66 370/238 |
| 2010/0097945 | A1 * | 4/2010 | Raftelis .......... H04L 63/1441 370/252 |
| 2010/0324845 | A1 | 12/2010 | Spanier |
| 2012/0300615 | A1 | 11/2012 | Kempf |
| 2012/0300859 | A1 | 11/2012 | Chapman |
| 2012/0331534 | A1 | 12/2012 | Smith |
| 2013/0121400 | A1 | 5/2013 | Eliezer |
| 2013/0163475 | A1 | 6/2013 | Beliveau |
| 2013/0311675 | A1 | 11/2013 | Kancherla |
| 2014/0003422 | A1 | 1/2014 | Mogul |
| 2014/0095685 | A1 | 4/2014 | Cvijetic et al. |
| 2014/0109182 | A1 | 4/2014 | Smith et al. |
| 2014/0280893 | A1 | 9/2014 | Pfeifer et al. |
| 2014/0317248 | A1 | 10/2014 | Holness et al. |
| 2014/0317256 | A1 | 10/2014 | Jiang et al. |
| 2014/0317293 | A1 | 10/2014 | Shatzkamer |
| 2014/0330944 | A1 | 11/2014 | Dabbiere et al. |
| 2014/0365634 | A1 | 12/2014 | Metz et al. |
| 2015/0281036 | A1 | 10/2015 | Sun et al. |
| 2016/0014819 | A1 * | 1/2016 | Cona ............ G01C 21/3415 455/404.1 |
| 2016/0050132 | A1 * | 2/2016 | Zhang ........... H04L 29/08153 370/252 |
| 2016/0112269 | A1 | 4/2016 | Singh et al. |
| 2016/0139939 | A1 | 5/2016 | Bosch et al. |
| 2016/0142427 | A1 | 5/2016 | de los Reyes et al. |
| 2016/0234234 | A1 | 8/2016 | McGrew et al. |
| 2016/0269432 | A1 * | 9/2016 | Lin .............. H04L 63/1458 |
| 2017/0019417 | A1 | 1/2017 | McGrew et al. |
| 2017/0026349 | A1 | 1/2017 | Smith et al. |
| 2017/0054626 | A1 | 2/2017 | Sivabalan et al. |
| 2017/0070416 | A1 | 3/2017 | Narayanan et al. |
| 2017/0222918 | A1 * | 8/2017 | Sebastian ........ H04L 12/6418 |
| 2017/0359383 | A1 * | 12/2017 | Rogers .......... H04L 63/0209 |
| 2018/0176090 | A1 * | 6/2018 | Lessmann ........ H04L 41/5022 |
| 2018/0241621 | A1 * | 8/2018 | Vaishnavi ....... H04L 45/72 |
| 2018/0287725 | A1 * | 10/2018 | Rabinovich ...... H04J 3/0667 |
| 2018/0287859 | A1 * | 10/2018 | Desigowda ...... H04L 41/0695 |
| 2019/0014139 | A1 * | 1/2019 | Wang ............ H04L 63/1441 |

FOREIGN PATENT DOCUMENTS

| | | |
|---|---|---|
| EP | 3109128 | 12/2016 |
| WO | 2016206741 | 12/2016 |
| WO | WO-2017067578 A1 * | 4/2017 .......... H04L 41/083 |

OTHER PUBLICATIONS

Ferrus, et al., "SDN/NFV-enabled satellite communications networks: Opportunities, scenarios and challenges." In: Physical Communication. Mar. 2016 (Mar. 2016).

PCT/US2019018424 International Search Report dated Apr. 24, 2019.

PCT/US2019/018424 Written Opinion of the International Searching Authority dated Apr. 24, 2019.

Gember et al., "Toward Software-Defined Middlebox Networking" In: Proceedings of the 11th ACM Workshop on Hot Topics in Networks. Oct. 30, 2012.

* cited by examiner

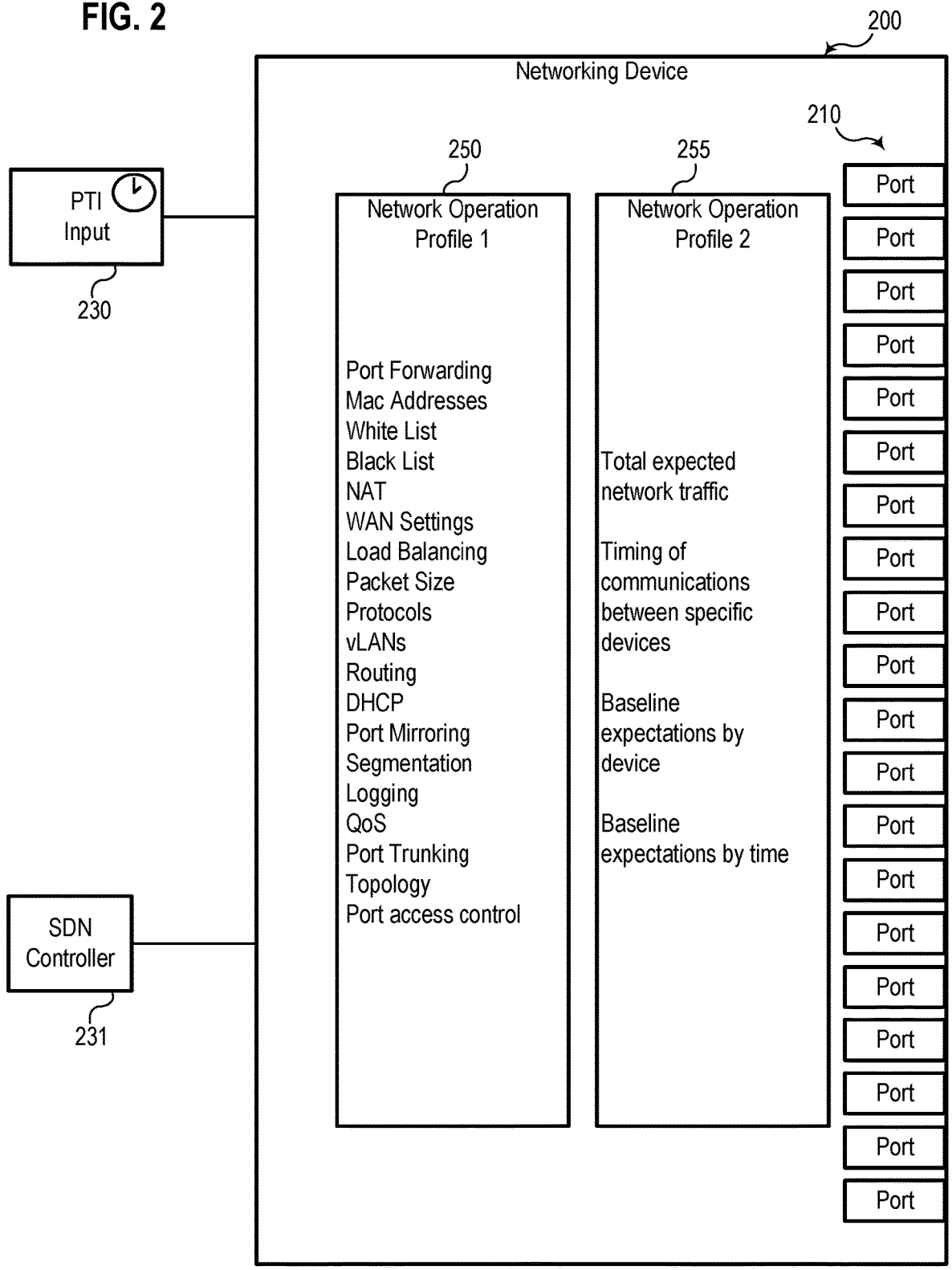

TIME-BASED NETWORK OPERATION PROFILES IN A SOFTWARE-DEFINED NETWORK

TECHNICAL FIELD

This disclosure relates to software-defined networks. More particularly, this disclosure relates to switching between predefined network traffic flow/operation profiles based precise time windows.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

FIG. 2 illustrates a networking device with two network operation profiles, at least one of which include time-based network flow rules.

DETAILED DESCRIPTION

Figure 1:
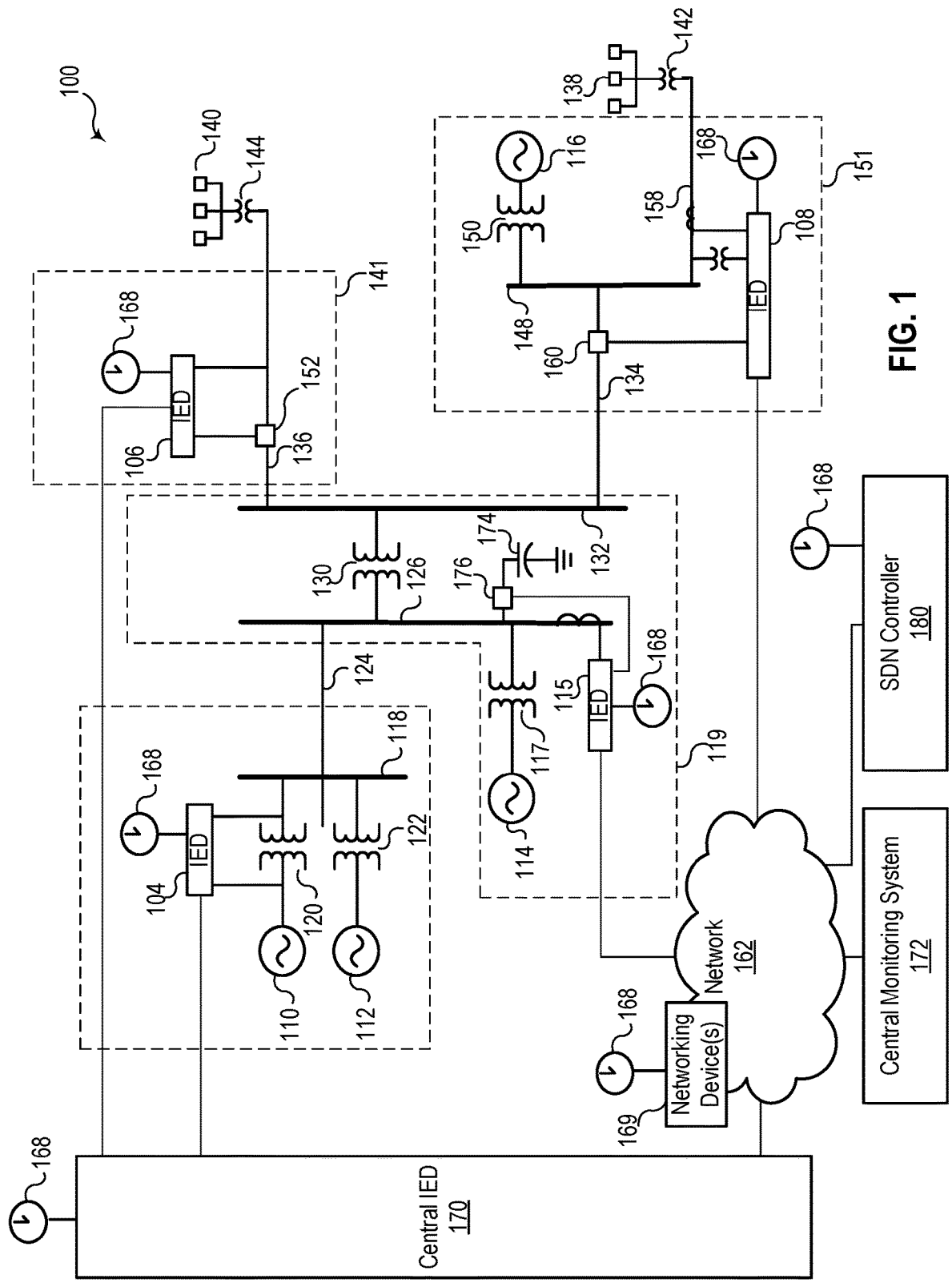
FIG. 1 illustrates an example of a simplified one-line diagram of an electric power transmission and distribution system in which various devices communicate via a software-defined network (SDN).

Electric power distribution and transmission systems include various monitoring and protection devices. A wide variety of communication and networking technologies may enable protection and monitoring functions within an electric power distribution or transmission system. Communication and networking devices may, among other things, facilitate an exchange of information, transmission of control instructions, and enable data acquisition. Some communication within an electric power distribution or transmission may be time-sensitive. For example, protective actions may be life or equipment saving if implemented quickly.

Critical infrastructure of an electric power distribution and transmission system is protected to prevent physical and electronic intrusion. For example, electric power systems (and the control, monitoring, and protective devices therein) may be subjected to cyber attacks. Some systems may incorporate software-defined network (SDN) technologies to regulate communications on a network interconnecting data stores, control devices, monitoring devices, protective devices, human interfaces, and/or other electronic equipment. A wide variety of data security and network control options are available using SDNs, including, without limitation, deny-by-default security, latency guarantees, deterministic transport capabilities, failover planning, fault tolerance, path reliability analysis, etc.

A network engineer or other information technology (IT) technician may use an SDN flow controller (e.g., a software application running on a general-purpose computer) to program a networking device. Examples of networking devices applicable to the systems and methods described herein include, but are not limited to: switches, hubs, repeaters, gateways, routers, network bridges, modems, wireless access points, and line drivers. As used herein the term "networking device" may, as the context allows, also encompass a wide variety of hybrid networking devices such as multilayer switches, protocol converts, terminal adapters, bridge routers, proxy servers, firewall devices, network address translators, multiplexers, network interface controllers, and the like. Thus, while many of the principles of the systems and methods are described herein using a network switch as an example, it is appreciated that such principles may be adapted for use with many other networking device types.

In some embodiments, a network engineer uses an SDN controller, or SDN flow controller, to dynamically program one or more networking devices. A network engineer may utilize an SDN controller to define a network operation profile to be implemented by one or more connected networking devices. A network operation profile may, among other things, define which data types are allowed on a network, the routing of the data between various devices on a network, prioritization of certain devices and/or data types, which devices are allowed to communicate on the network, which devices are allowed to communicate with which other devices, etc.

As described above, a network engineer can use an SDN controller to program the networking device with a specific network operation profile. Once programmed, the networking device can continue to implement the defined network operation profile even if the SDN controller is offline or disconnected. When changes are needed or desired, the network engineer can use the SDN controller to modify the network operation profile or define a new network operation profile for the networking device. In some embodiments, the network engineer can use the SDN controller to modify the network operation profile in real time without disrupting data flow on the network.

In defining a network operation profile, a balance is typically struck between security, accessibility, and/or usability. For example, a network switch may be programmed with a network operation profile that prohibits Telnet communications from a physical access controller, such as a human machine interface (HMI), to a relay of a power distribution system. Disabling Telnet communications to the relay may increase security, but also prevent easy access to the relay by an authorized operator. Per the embodiments described above, a network engineer may temporarily modify the network operation profile of the network switch to allow the authorized operator to interact with the relay via Telnet communications.

That is, Telnet communications may be manually enabled through the use of an SDN flow controller, such as a software application running on a general-purpose computer. Such a process may require multiple users, take a substantial amount of time, require reprogramming of one or more networking devices, and/or be otherwise cumbersome and susceptible to human error both in the reprogramming and in reverting back to the original programming when the authorized operator is finished.

In a control system environment, various intelligent electronic devices (IEDs) are automated to communicate with one another on an SDN. In various embodiments, a system may determine a baseline state for machine-to-machine communications traffic between IEDs on an SDN. Some IEDs may send control system packet data at defined intervals, within a small window of jitter. For example, a master device may continuously or periodically pole a monitoring device (e.g., via DNP3 requests) to request information. The information received from the monitoring device may be used for protection, monitoring, and/or for updating information on a dashboard or HMI. In such an embodiment, communication between the master device and the monitoring device may occur on a consistent basis and a supervisory system may monitor such communication and establish a baseline expectation of communications between tens or even hundreds of IEDs on an SDN.

In some embodiments, a networking device within an SDN switch may be programmed with flow rules that include precise time conditions for accepting nominal packet forwarding that conforms to the established baseline. They system may establish baselines for each of a plurality of periods. Each period may be defined in terms of years, hours, minutes, seconds, or fractions of seconds. For example, certain network traffic may be expected during certain times of the day, but not during other times of the day. Accordingly, a first baseline may be used for one portion of the day and a second baseline may be used for a second portion of the day. If network traffic deviates from the expected baselines for a given period, a networking device may be configured to drop the packet, copy and forward to a supervisory controller, conduct enhanced packet inspections to detect a threat, and/or provide an alert to a supervisory system and/or an operator.

As a specific example, a SCADA controller may poll monitoring devices every two seconds. If polling is observed at one second or fifteen seconds, the associated network packets may be marked as deviant and scrutinized or treated as described above. More generally, the system may identify network traffic that deviates from an established baseline for a given period as possible spoof injection packets that merit additional analysis.

In some embodiments, an SDN controller may be configured to modify the network operation profile of one or more networking devices at specific times. However, such an approach would be time-consuming to program, cumbersome, and/or require that the SDN controller be operational and connected to the networking devices at all times. In some embodiments, it may be desirable that the networking devices remain fully functional and able to implement all network flows and changes thereto even when an SDN controller is disconnected.

Accordingly, this disclosure includes additional systems and methods relating to networking devices that, independent of an SDN controller, allow for switching between two or more stored network operation profiles based on one or more of: (i) time to live, (ii) general time windows, and (iii) precise time windows. A time to live (TTL) approach allows for a programmed network operation profile (or sub portion thereof) to be programmed to run for a defined amount of time until it expires. However, a TTL flow rule may not include a time period with a future start time. Rather, a TTL approach is typically programmed in real-time by a connected controller to begin running until an expiration time.

In various embodiments, network flows defined in terms of general and precise time windows may be based, at least in part, on established network traffic baselines for the given period. A system may establish a baseline or "normal" traffic flow for a given time window defined in terms of any of a wide variety of measurable and/or identifiable network communication characteristics, including, but not limited to: the number of devices communicating during the time window, the types of devices communicating during the time window, the specific devices communicating during the time window, protocols used during the time window, total data rate, average data rate, etc. For a general time window, the system may establish baseline characteristics during a period of minutes, hours, days, weeks, or even months. For a precise time window, the system may establish baseline characteristics during a period of minutes, seconds, or even fractions of seconds.

In some embodiments, a system may determine baseline characteristics based on measured data. For example, network communication characteristics may be measured during periods corresponding to a general or precise time window. Multiple measurements from multiple periods may be averaged together in some embodiments. in other embodiments, ratings, specification, and/or configuration settings of various devices and/or protocols on the network may be used to establish a baseline. For example, information indicating that a SCADA controller on the network is configured to poll every two seconds may be incorporated into the baseline determination.

Using the baseline approach, a networking device may be programmed with distinct network operation profiles for two or more time windows (precise or general). Each of the distinct network operation profiles may be based, at least in part, on established baseline network characteristics. The networking device may switch between the distinct network operation profiles seamlessly without interruption to the network or packet loss. Network operation profiles may alternatively or additionally include configuration settings unrelated to established baselines. In some embodiments, network operation profiles defined with precise time windows may be imbedded or nested within network operation profiles defined with general time windows.

For example, a first network operation profile may be defined for a general time window corresponding to 20:00 hours until 05:00 hours. A second network operation profile may be defined for a general time window 05:00 hours until 20:000 hours. The first network operation profile may restrict or enhance packet inspections of communications from HMIs that are assumed to be unattended during the evening hours. The second network operation profile corresponds to traditional working hours and may loosen restrictions on communications from HMIs.

Additional network operation profiles based on precise time windows may be implemented during the implementation of first and/or second network operation profiles defined in precise time windows. For example, a profile selection module of a networking device may implement network operation profile associated with the SCADA controller based on a precise time input (PTI) to ensure that polling and responses are received at the expected two-second intervals. Communications from the SCADA controller or associated monitoring devices that deviate from expectations may be scrutinized, sent to an intrusion detection system, forwarded to an alarm system, and/or dropped from the network.

Networking devices may receive precise time inputs using any of a wide variety of protocols, such as the precision time protocol (PTP), network time protocol (NTP), a global positioning system (GPS) signal, synchronized optical network (SONET) inputs, and/or the like. Precision time inputs may be used to implement network operation profiles defined by a precision time window. In some embodiments, networking devices may include an internal clock that provides a precision time signal. The internal clock may be calibrated once, periodically, and/or continually by an external precision time input.

Networking devices may utilize a prevision time input to perform additional functions such as low-latency path identification, provisioning of new network flows, meeting quality of service (QoS) requirements, implementing real-time protection schemes, etc.

As another specific example, a network engineer may use an SDN controller to configure a network switch with two distinct network operation profiles. The two distinct network operation profiles are stored in a memory of the networking device for selective implementation during precise time windows. The networking device may receive a precise time via timing input (e.g., via a PTP or NTP input). The SDN controller may then be disconnected from the network switch.

A first network operation profile may prevent Telnet communications on the network and a second network operation profile may allow Telnet communications on the network. The first network operation profile may be implemented by default to provide increased security on the network by preventing Telnet communications. However, the second network operation profile that allows Telnet communications may be automatically implemented during a predefined precise time window. For example, maintenance updates may be scheduled for the fourth Sunday of each month between 02:00 and 04:00 hours. The network switch may use the precise time input to seamlessly implement the second network operation profile for those two hours every fourth Sunday, after which the network switch reverts back to the first network operation profile.

As used herein, a network operation profile may define any of a wide variety of network elements. For example, a network operation profile may define the port forwarding configurations, device privileges, user privileges, load balancing, network address translation handling, traffic routing, traffic prioritization, packet size, allowed protocols, virtual local area network changes, redundancy routing, port mirroring, traffic segmentation, data logging configurations, quality of service settings, selective virtual local area network configurations, port trunking, port access control lists (PACLs), virtual access control lists (VACLs), ring topologies, and other networking device settings.

There are too many permutations and combinations of networking device settings to exhaustively list them all. Accordingly, this disclosure includes a few examples with the understanding that many more combinations are possible. Moreover, the variations in network operation profiles may also vary significantly based on the type of networking device being configured. For example, a network operation profile for a managed switch may not include DHCP settings, while a network operation profile for a router might. Similarly, a network operation profile for a firewall or edge router device might include different network operation profile settings than a repeater would. A network operation profile an intrusion detection system may include various settings related to baseline comparisons and complex analysis functions, while an unmanaged network switch may include relatively simple configuration settings.

The specific settings applicable to a network operation profile depend largely on the type of networking device being configured and will be appreciated by one of skill in the art. Regardless of the available and applicable configuration settings, the systems and methods described herein modify the functionality of such devices by allowing them to store two or more network operation profiles that are associated with a time window to begin implementation and end implementation. A precise time input provided to the networking device ensures that the time-based network operation profiles are implemented during the specified time window.

As another example, a profile selection module of a network switch may implement a first network operations profile during a first time window. The first network operation profile may prevent certain communication protocols, limit communication between certain devices, and have a defined port forwarding table. The profile selection module may implement a second network operations profile during a second time window based on a precision time input. The second network operations profile may, for example, cause the network switch to create two virtual local area networks (VLANs), allow some previously disabled communication protocols, and/or allow for communication between two devices that was previously prevented. The profile selection module may be implemented in hardware, firmware, and/or software.

In some embodiments, a single network operations profile may utilize a precision time input to monitor network communication flows. As described above, the network operations profile may set forth baseline expectations for DNP3 poll requests and responses. If network communication flows deviate from the established baseline expectations, an operator or supervisory system may be alerted, the communication may be prevented, and/or the state of the network may be changed to a different network operations profile that is more restrictive to provide increased security.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term "IED" may be used interchangeably to describe an individual IED or a system comprising multiple IEDs.

Some of the infrastructure that can be used with embodiments disclosed herein is already available, such as: general-purpose computers, computer programming tools and techniques, digital storage media, virtual computers, virtual networking devices, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc. that perform one or more tasks or implement particular abstract data types.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates an embodiment of a simplified one-line diagram of an electric power transmission and distribution system 100 in which a plurality of communication devices facilitate communication in a software-defined network (SDN) consistent with embodiments of the present disclosure. The electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to the bus 126 through a step-up transformer 117. The bus 126 may be connected to a distribution bus 132 via a step-down transformer 130. Various distribution lines 136 and 134 may be connected to the distribution bus 132. The distribution line 136 may lead to a substation 141 and the line may be monitored and/or controlled using an IED 106, which may selectively open and close a breaker 152. A load 140 may be fed from the distribution line 136. A step-down transformer 144 in communication with the distribution bus 132 via the distribution line 136 may be used to step down a voltage for consumption by the load 140.

The distribution line 134 may lead to a substation 151, and deliver electric power to the bus 148. The bus 148 may also receive electric power from the distributed generator 116 via a transformer 150. The distribution line 158 may deliver electric power from the bus 148 to the load 138 and may include another step-down transformer 142. The circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal 168 may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The common time signal 168 may be distributed in system 100 using a communications network 162 or using a common time source, such as a Global Navigation Satellite System ("GNSS"), or the like. The common time signal 168 may be distributed using, for example, PTP or NTP protocols.

According to various embodiments, the central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170 and may communicate over various media such as a direct communication from IED 106 or over a wide-area communications network 162, such as via a virtual private network (VPN). According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via the network 162 may be facilitated by networking devices 169. One or more of the networking devices 169 may receive the common time signal 168. Examples of networking devices 169 include, but are not limited to, multiplexers, routers, hubs, gateways, firewalls, and switches. In some embodiments, IEDs and networking devices may comprise physically distinct devices. In other embodiments, IEDs and networking devices may be composite devices or may be configured in a variety of ways to perform overlapping functions. IEDs and networking devices may comprise multi-function hardware (e.g., processors, computer-readable storage media, communications interfaces, etc.) that can be utilized to perform a variety of tasks that pertain to network communications and/or the operation of equipment within system 100. Thus, the terms networking device and IED may be used interchangeably in some instances to the extent that the IED is interacting with a network (e.g., an SDN) and/or to the extent that a networking device is performing a function of an IED as described herein.

An SDN controller may be configured to interface with one or more of the networking devices 169. The SDN controller may facilitate the creation of an SDN within the network 162 that facilitates communication between various devices, including IEDs 170, 115, 108, and monitoring system 172. In various embodiments, the SDN controller may be configured to interface with a control plane (not shown) in the network 162. An operator may use the SDN controller to define (e.g., program) network operation profiles of one or more networking devices and/or IEDs connected to the network 162. One or more of the network operation profiles may be configured for implementation during a time window. The common time input 168 may provide a precise time input to the networking devices 169. The networking devices 169 may use the precise time to implement the one or more time-based network operation profiles during a precise time window.

The networking devices 169 may further use the precise time from the common time input 168 to implement time-based functions within the network operation profile. For example, a network operations profile implemented by one of the networking devices 169 may define an expected baseline communication between IED 115 and central IED 170. The networking device may determine that the precise timing of communications between IED 115 and central IED 170 deviates from an expected timing of communication as set forth in the network operations profile. The network operations profile may set forth the response or behavior of the networking device in the event of such a deviation. For example, the networking device may be configured to forward the deviate communications to the central IED 170 and raise and alert. Alternatively, the network operations profile may instruct the networking device to drop deviant packets or forward deviant packets to an intrusion detection system in addition to or instead of central IED 170.

FIG. 2 illustrates a networking device 200 with two network operation profiles 250 and 255 defined by an SDN controller 231 and a precision time input (PTI) 230. As illustrated, the networking device may include any number of network communication ports 210. In some embodiments, the SDN controller 231 is connected via one of the network communication ports 210. A network engineer or other user may define a first network operation profile 250 to implement a first network flow.

The first network operation profile 250 may set forth any number of network settings and/or functionalities, including but not limited to: port forwarding configurations, device privileges, user privileges, load balancing, network address translation handling, traffic routing, traffic prioritization, packet size, allowed protocols, virtual local area network changes, redundancy routing, port mirroring, traffic segmentation, data logging configurations, quality of service settings, selective virtual local area network configurations, port trunking, port access control lists (PACLs), virtual access control lists (VACLs), ring topologies, and other networking device settings.

The SDN controller 231 may be used to define a second network operation profile 255 with a different combination of settings. In the illustrated embodiment, the second network operation profile 255 does not modify the actual network flow. Instead, the second network operation profile 255 may include time-based network flow monitoring rules (referred to herein as "time-based rules" or "time-based flow rules"). For example, the second network operation profile 255 may define a baseline expectation for network traffic during a precise time window. The second network operation profile 255 may define an action to be implemented by the networking device 200 if the network traffic exceeds the baseline expectation during the precise time window.

The second network operation profile 255 may set forth communication timing expectations between specific devices (e.g., timing expectations for SCADA or DNP3 polling). The second network operation profile 255 may set forth baseline expectations for specific devices. An IED may be expected to respond to DNP3 polling within 900 milliseconds of receiving a DNP3 request from a supervisory device. The second network operation profile 255 may identify the precise time (using PTI input 230) the IED receives the DNP3 request from the supervisor device. Responses from the IED that are outside of the 900-millisecond precise time window may be ignored, dropped, forwarded to an intrusion detection system, or otherwise marked as deviant.

In various embodiments, the first network operations profile 250 may be implemented during a general time window, such as during working hours or after hours. The general time window may be defined using a 24-hour clock. For example, the first network operations profile 250 may be configured to run always, between 14:00 and 22:00 hours, or within another time window defined according to a 24-hour clock. Alternative time keeping approaches other than a 24-hour clock can be used. In some embodiments, the second network operation profile 255 may be thought of as modifying the behavior of the first network operations profile 250 during precise time windows and/or in response to network events that trigger time-based rules (i.e., a network event trigger), rather than as defining a completely new network operations profile.

Figure 3A:
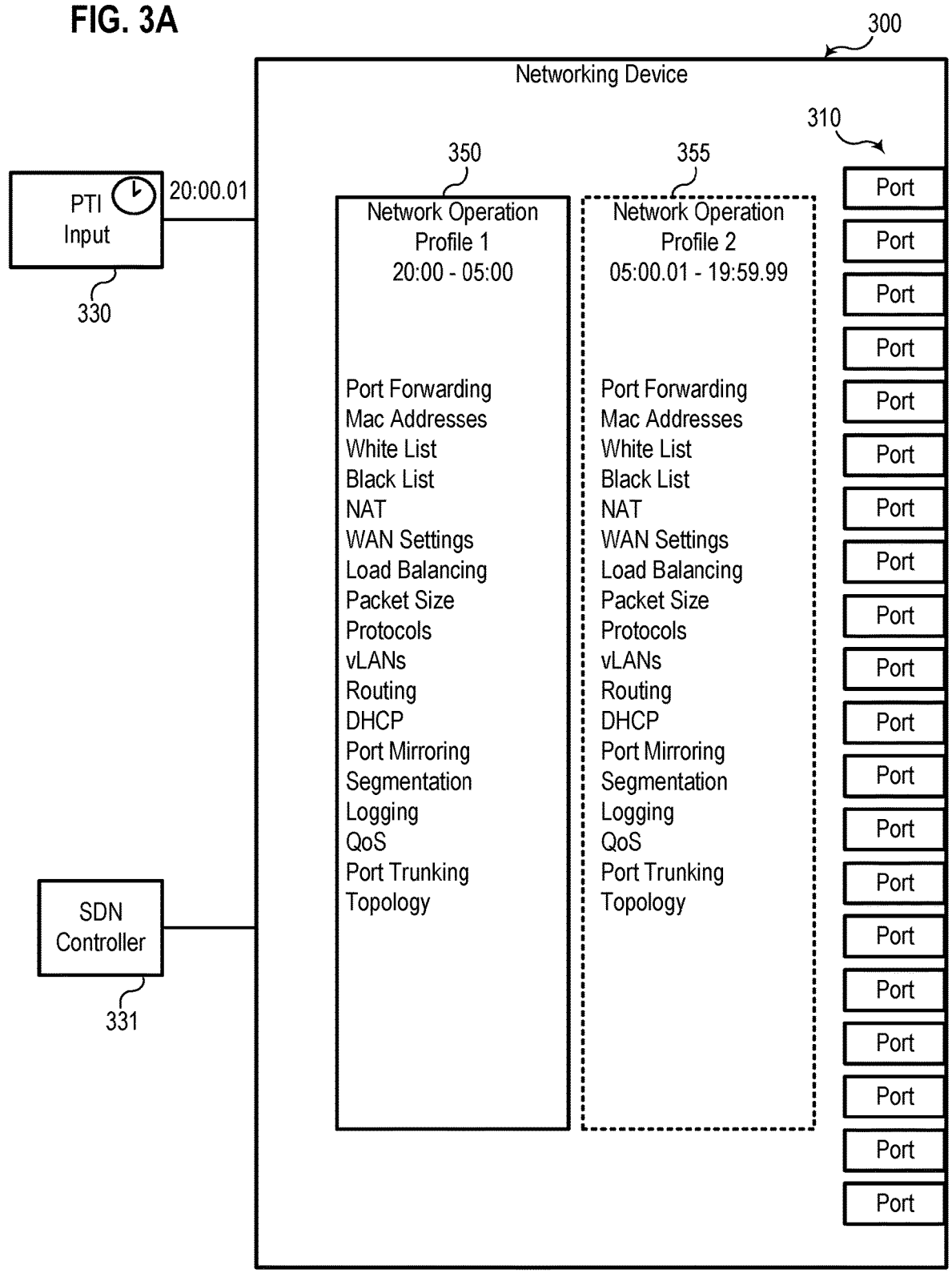
FIG. 3A illustrates the networking device with two network operation profiles stored for implementation based on the precise time input.

FIG. 3A illustrates the networking device 300 with the two network operation profiles 350 and 355 stored for implementation during different time windows, even when an SDN controller 331 is disconnected. A PTI input 330 provides a precise time to the networking device 300. In some embodiments, PTI input 330 is provided via one of ports 310 even though it is shown as a separate/unique port for convenience in the illustrated embodiment. A network engineer or other user may define each of the first 350 and second 355 network operation profiles to implement distinct network flows.

The first network operation profile 350 may set forth any number of network settings and/or functionalities, including but not limited to: port forwarding configurations, device privileges, user privileges, load balancing, network address translation handling, traffic routing, traffic prioritization, packet size, allowed protocols, virtual local area network changes, redundancy routing, port mirroring, traffic segmentation, data logging configurations, quality of service settings, selective virtual local area network configurations, port trunking, port access control lists (PACLs), virtual access control lists (VACLs), ring topologies, and other networking device settings.

The second network operation profile 355 may set forth a number of changes to the first network operation profile 350 and/or define a new set of network settings and/or functionalities. Each of the first 350 and second 355 network operation profiles may be associated with specific time windows. In the illustrated embodiment, the first network operation profile 350 is associated with a time window of 20:00 to 05:00 each day. The second network operation profile 355 is associated with a time window of just after 05:00 until just before 20:00. The networking device 300 may use the precision time provided by PTI input 330 to transition between the two networking operation profiles at the established times. FIG. 3A illustrates a precise time of 20:00.01, so the first network operation profile 350 is currently implemented (solid lines), while the second network operation profile remains inactively, but stored in memory.

Figure 3B:
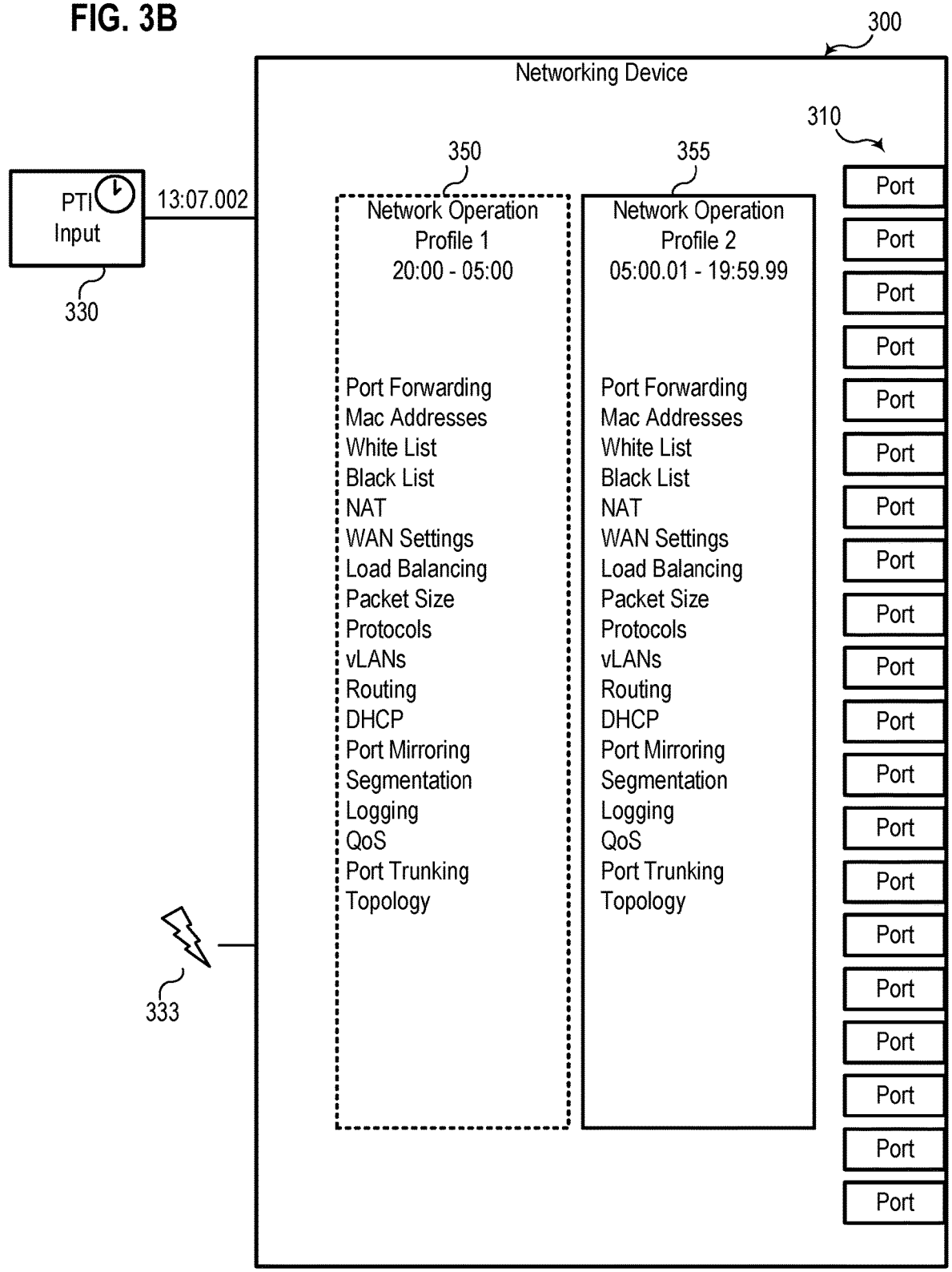
FIG. 3B illustrates the networking device with the second network operation profile selected based on the precise time input even though an SDN controller is offline.

FIG. 3B illustrates the networking device 300 implementing the second network operation profile 355 based on the precise input time of 13:07.001 from the PTI input 330. The transition between the first 350 and second 355 network operation profiles occurs independent of the SDN controller 331. As illustrated, at 333, the SDN controller 331 can be disabled or disconnected from the networking device 300 without impacting the functionality of the networking device 300 and/or the ability to transition between time-based network operation profiles.

Figure 4A:
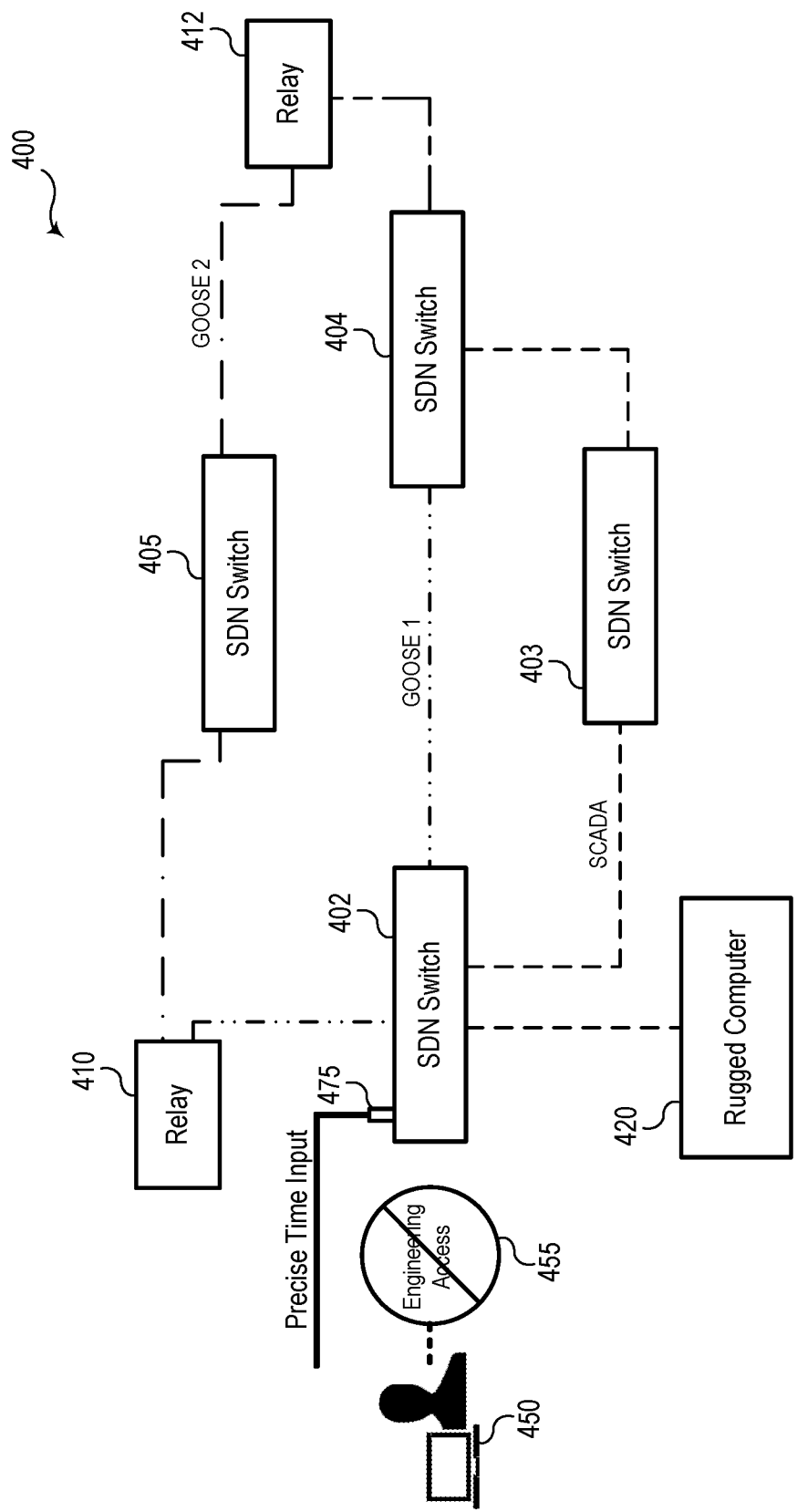
FIG. 4A illustrates an SDN with a plurality of networking devices, at least one of which is implementing a first network operation profile that disables engineering access via a human machine interface (HMI).

FIG. 4A illustrates an SDN 400 with a plurality of networking devices, at least one of which is implementing a first network operation profile that disables engineering access, at 455, via a human-machine interface (HMI) 450. Implementation of the first network operation profile may be based on the current time, as provided via a precision time input port 475. As illustrated, the SDN may include SDN switches 402, 403, 404, and 405. The SDN network may also include a rugged computer 420 and relays 410 and 412. Various communication protocols and communication paths may be utilized. The SDN switch 402 and/or SDN switches 403, 404, and 405 may implement a first network operation profile during a first precision time period that allows for the illustrated network flows using GOOSE and SCADA protocols. However, the first network operation profile may not allow engineering access 455 and/or associated protocols.

Figure 4B:
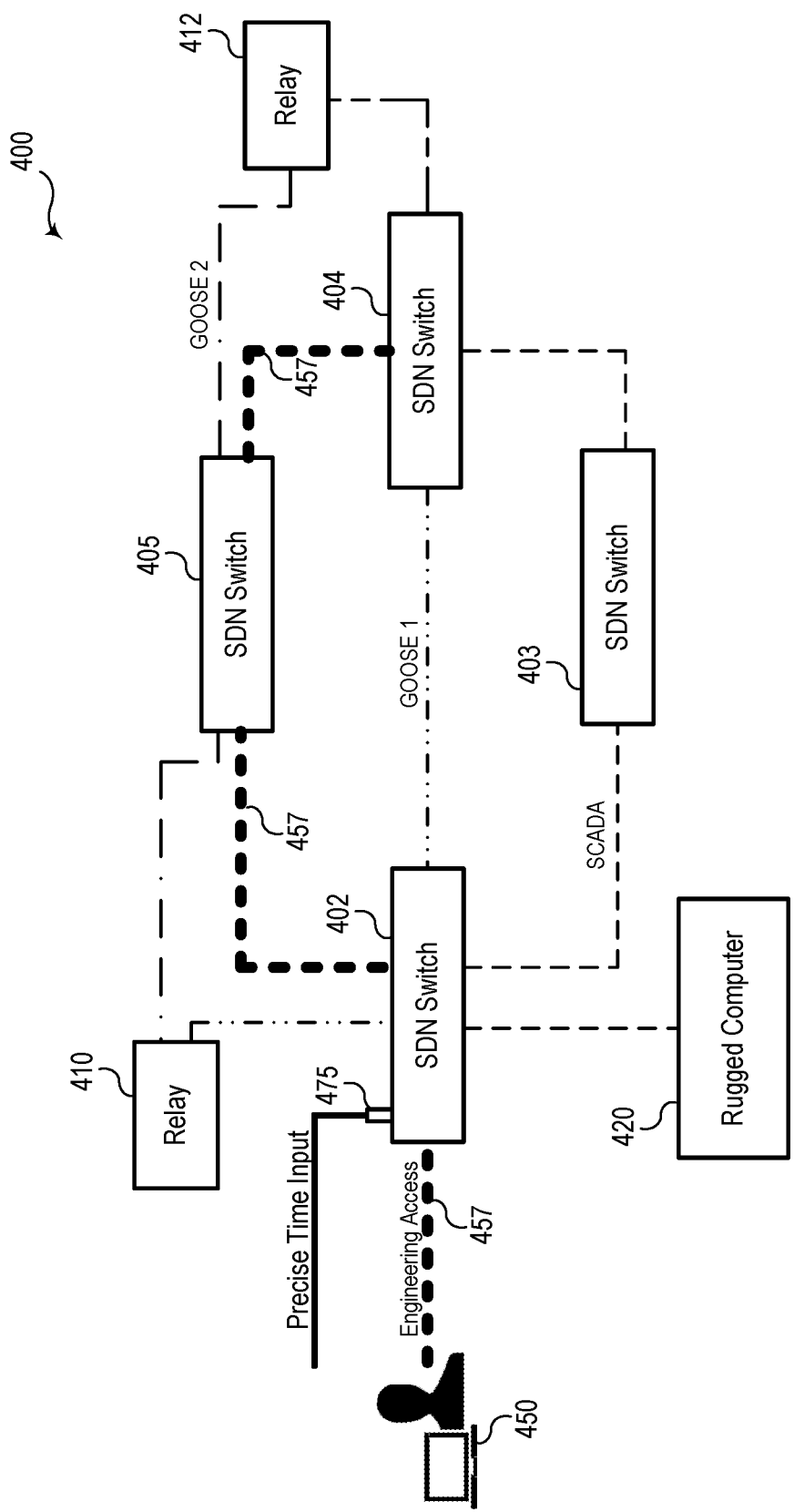
FIG. 4B illustrates the SDN with at least one of the networking devices implementing a second network operation profile based on the precise time input, where the second network operation profile enables engineering access.

FIG. 4B illustrates the SDN 400 with at least one of the networking devices (e.g., SDN switches 402, 403, 404, and 405) implementing a second network operation profile based on the precision time input port 475. As illustrated, the second network operation profile allows engineering access 457 via HMI 450. The engineering access 457, including various connections and associated protocols, is shown as a new network flow between HMI 450, SDN switch 402, SDN switch 405, and SDN switch 404. In some embodiments, other network operation profiles may allow still other network flows between other devices and/or utilizing still other protocols.

Figure 5A:
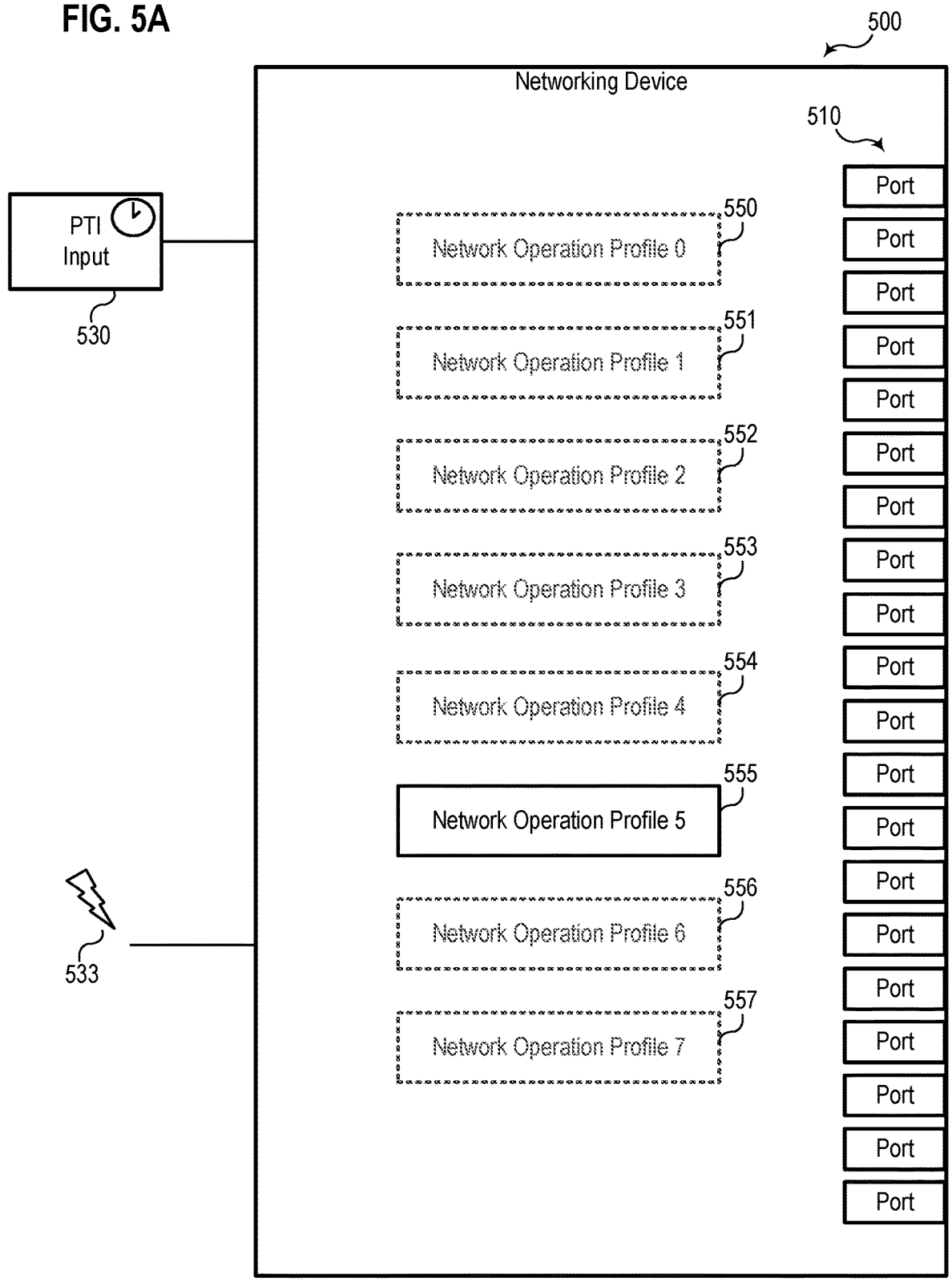
FIG. 5A illustrates a networking device with eight network operation profiles selectable based on the status of the precise time input.

FIG. 5A illustrates a networking device 500 with eight network operation profiles (550-557) that are each associated with a distinct time window. The networking device 500 implements a given network operation profile (550-557) based on a time signal received via the PTI input 530. As illustrated, no SDN controller 533 is connected to the networking device 500 to modify network flows (e.g., by modifying a network operation profile). In some embodiments, multiple network operation profiles may share overlapping time windows. Conflict settings of the networking device and/or set forth as part of the network operation profiles may resolve any conflicts between concurrently implemented network operation profiles.

In some embodiments, one of the network operation profiles 550-557 may be assigned as a default network operation profile that is implemented when none of the other network operation profiles 550-557 are being implemented (e.g., when the precision time from the PTI input 530 does not corresponding to the assigned time window of any of the other network operation profiles 550-557). In the illustrated embodiment, the sixth network operations profile 555 is implemented based on the PTI input 530.

Figure 5B:
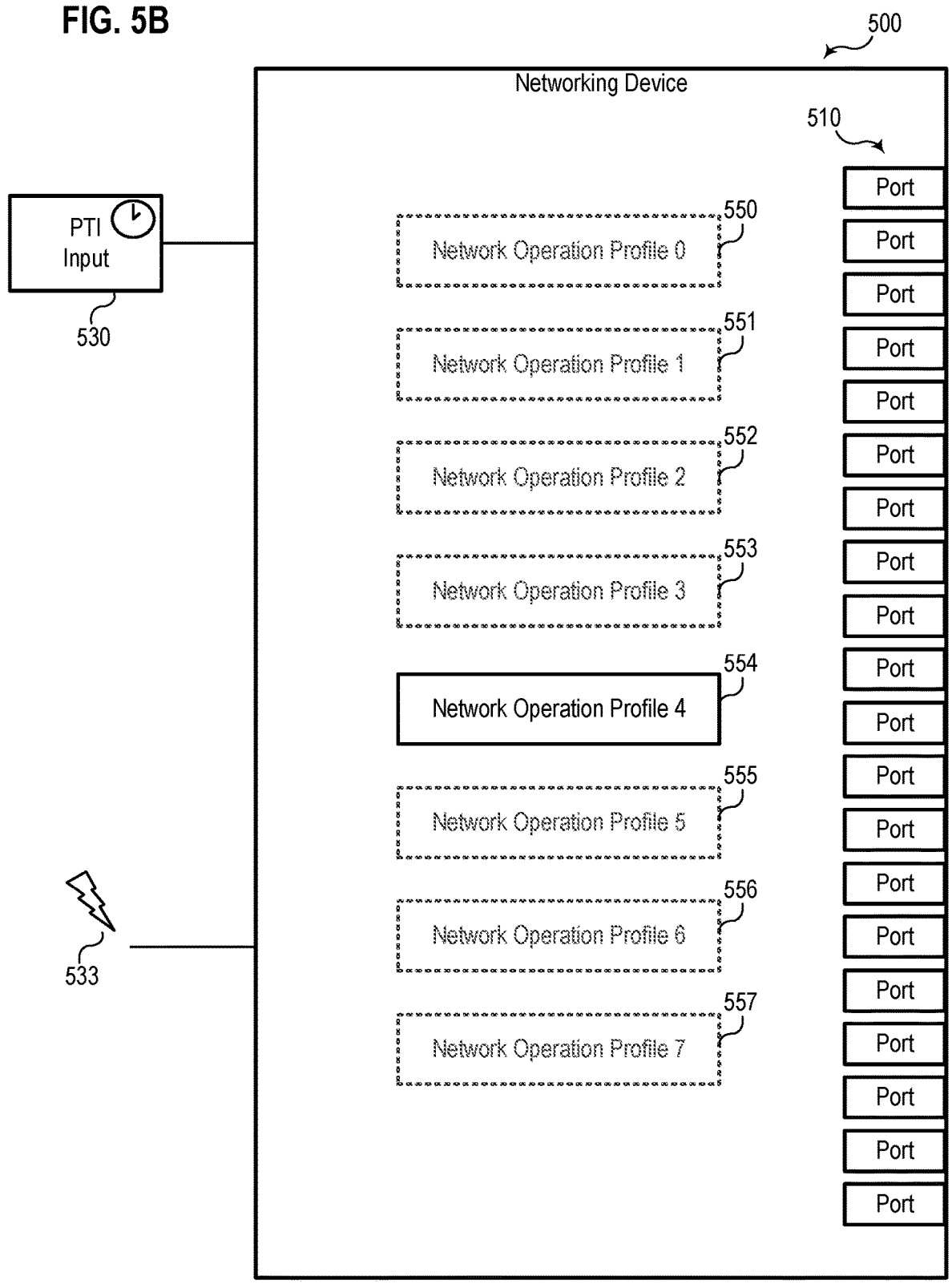
FIG. 5B illustrates the networking device with a different network operation profile selected based on a change in the precise time input.

FIG. 5B illustrates the networking device 500 with network operation profile 554 selected based on the PTI input 530. As previously described, network operation profile 554 may provide for different network flows than the network operation profile 555. Transition to network operation profile 554 from network operation profile 555 may be seamless (e.g., without any network disruption) and occur even when an SDN controller is offline, at 533.

Figure 6:
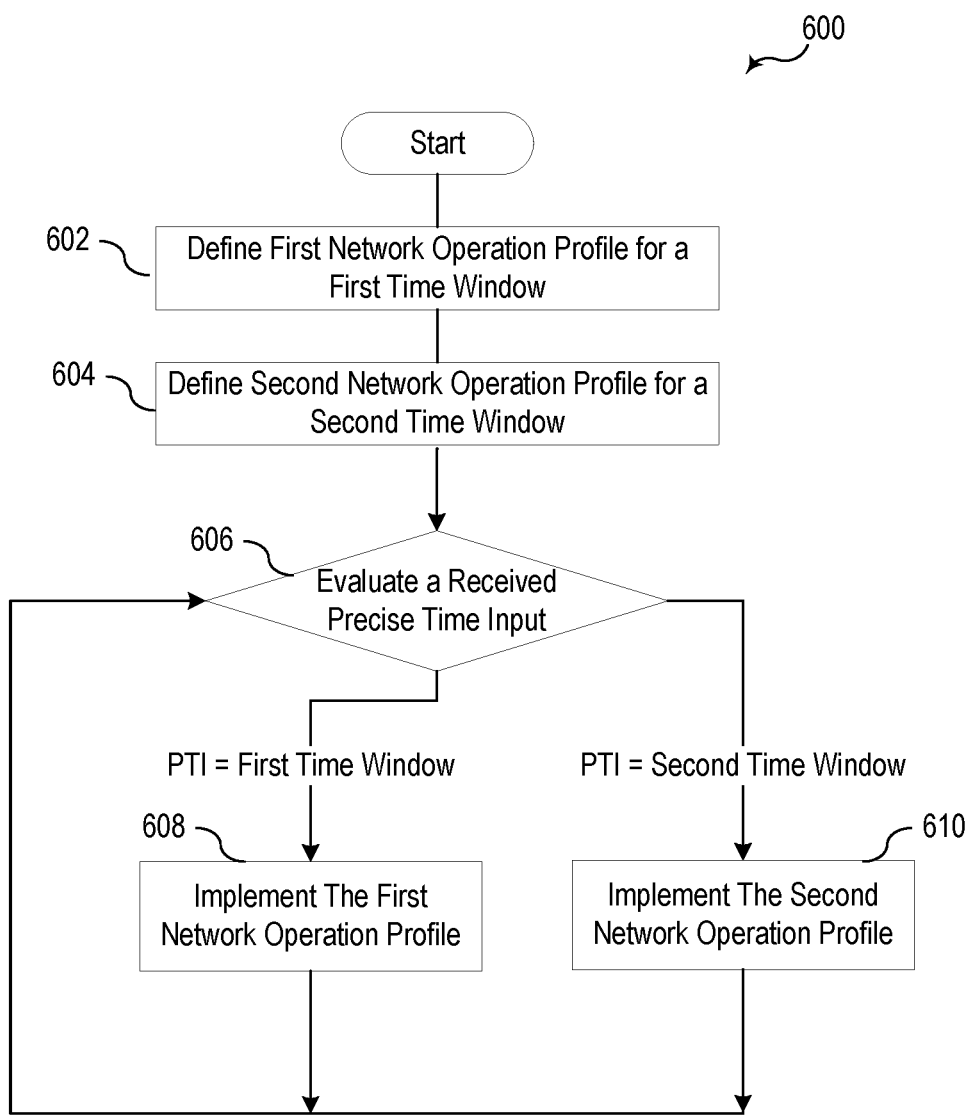
FIG. 6 illustrates a flowchart of an example of a method for selecting between two network flows associated with time-based network operation profiles.

FIG. 6 illustrates a flowchart of an example of a method 600 for selecting between two network flows associated with distinct network operation profiles selected based on a precise time input. A first network operation profile is defined, at 602, for implementation during a first time window. For example, an SDN controller may be used to define the first time-based network operation profile. The SDN controller may define, at 604, a second network operation profile for implementation during a second time window. The networking device may intermittently or continually evaluate the status of the precise time input, at 606. If the precise time input is within the first time window, then the networking device may implement, at 608, the first network operation profile. If the precise time input is within the second time window, the networking device may implement, at 610, the second network operation profile. One of the first and second network operation profiles may be assigned as a default network operation profile in the event that the precise time input is not within either the first or second time window. In other embodiments, the networking device may require that the defined networking operation profiles be associated with time windows that encompass all possible times.

The embodiments described above may be described as utilizing a time-based network operation profile configured to be implemented during a precision time window, where the precision time window has a defined start time and a defined end time. In some embodiments, the end time may be defined in absolute terms or in terms of the start time. Similarly, in some embodiments, the start time may be defined in absolute terms or in terms of a network event or the end time of another network operation profile.

Figure 7:
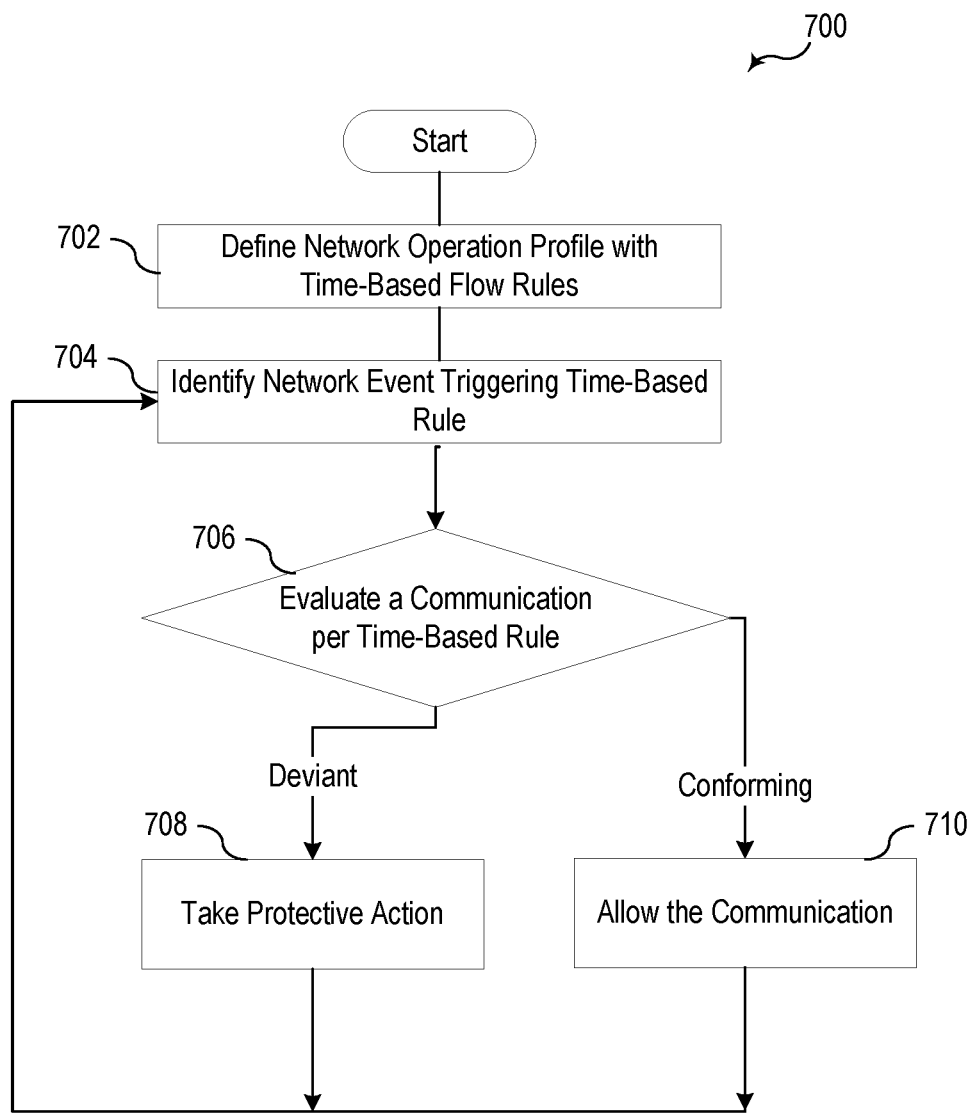
FIG. 7 illustrates a flowchart of a general example of a method for evaluating communications based on a time-based rule in response to a triggering event.

FIG. 7 illustrates a generalized flowchart of an example of a method 700 for implementing a time-based rule of a network operation profile. An operator may use an SDN controller to define, at 702, a network operation profile with one or more time-based flow rules. The time-based flow rules may be implemented at precise times. For example, a time-based rule may have a defined start time and a defined stop time. The time-based rule may be implemented once or configured to repeat. For example, a time-based rule may be implemented for one time for a specific duration on a specific day. In other embodiments, the time-based rule may be implemented for a specific duration of time each month, each day, or each hour.

In the illustrated embodiment, the time-based rule may be event triggered, at 704. That is, the occurrence of a specific network event may trigger a time-based rule (i.e., a network event trigger). The time-based rule may be used to evaluate a communication, at 706. If the communication is deviant from a defined expectation, the networking device may take protective action, at 708. For example, the networking device may prevent the communication, send an alert, and/or forward the communication to a supervisory system. If the communication conforms to the specifications of the time-based rule, the communication may be allowed, at 710, without interruption. The time-based rule described above may be described as utilizing a time-based network operation profile configured to be implemented during a precision time window, where the precision time window has an end time defined as a function of the start time and where the start time is defined with respect to a triggering event.

Figure 8:
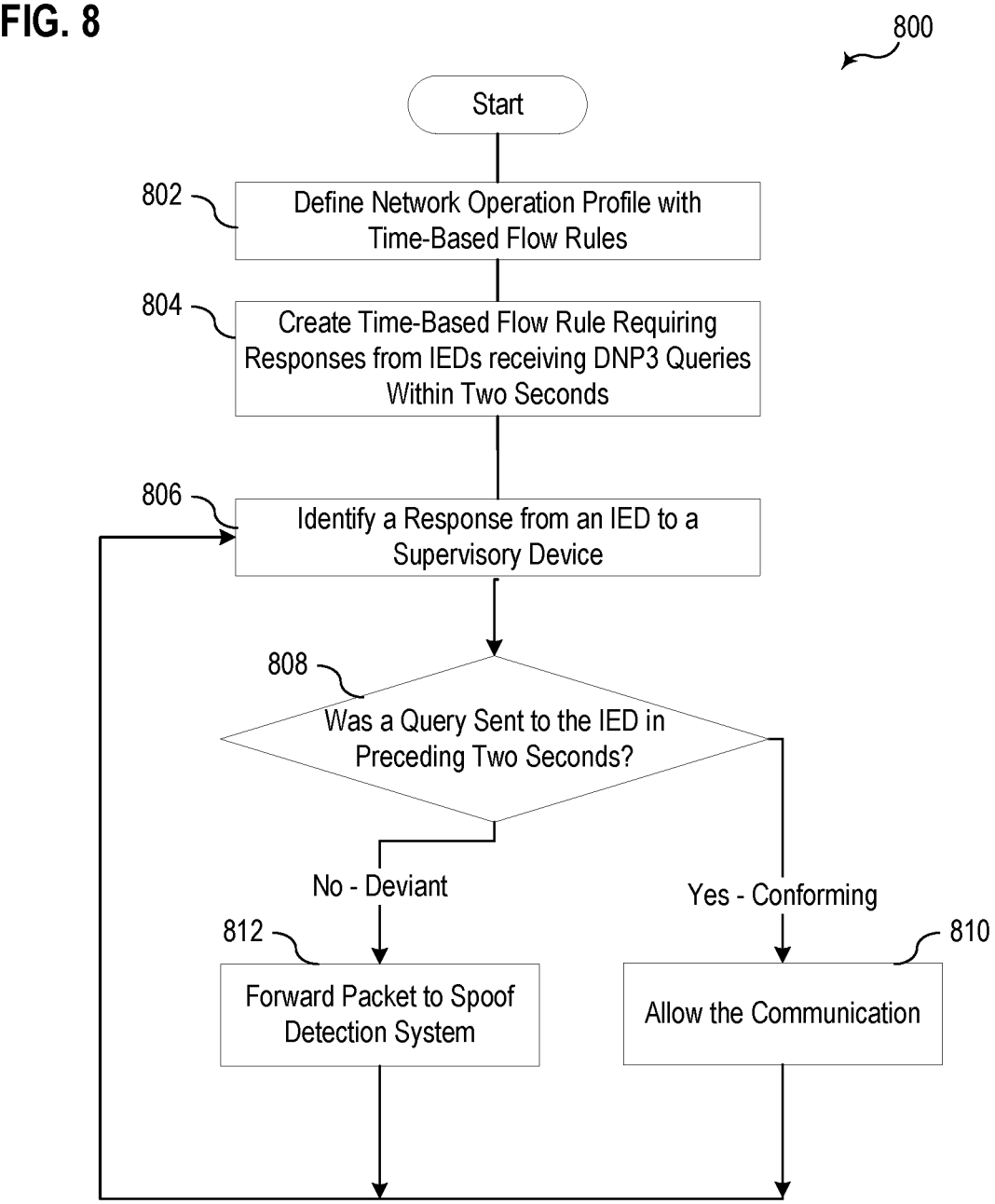
FIG. 8 illustrates a flowchart of a specific example of a method for evaluating communications based on a time-based rule in response to a triggering event.

FIG. 8 illustrates a flowchart of a specific example of a method for implementing a time-based rule of a network operations profile. An SDN controller may define a network operation profile with one or more time-based flow rules, at 802. A specific time-based rule may be created that requires responses from IEDs receiving DNP3 Queries within two seconds, at 804. If the networking device identifies a response from an IED to a supervisory device, at 806, then the time-based rule may be triggered. The networking device may determine if a DNP3 query was sent to the IED in the preceding two seconds, at 808. If so, then the response from the IED may be determined to be conforming, at 810 and the communication (response) from the IED may be forwarded to the supervisory device. Otherwise, the response from the IED may be identified as deviant, at 812, and the communication may be forwarded to a spoof detection system for further evaluation.

The methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified and/or steps or actions may be omitted.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware and/or software modules or components. As used herein, a module or component may include various hardware components, firmware code, and/or any type of computer instruction or computer-executable code located within a memory device and/or transmitted as transitory or nontransitory electronic signals over a system bus or wired or wireless network. Many of the embodiments described herein are shown in block diagram form and/or using logic symbols. It is appreciated that various elements of each of the illustrated and described embodiments could be implemented using FPGAs, custom application specific integrated circuits (ASICs), and/or as hardware/software combinations.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A software-defined networking device, comprising:
   a processor;
   a plurality of communication ports for network communications;

a precision time input port to receive a precision time signal;

a non-transitory computer-readable medium to store a plurality of network operation profiles,
wherein each of the plurality of network operation profiles is implementable by the processor to control network behavior via the plurality of communication ports, and
wherein one of the network operation profiles comprises a time-based network operation profile defined for implementation during a precision time window, wherein the precision time window of the time-based network operation profile is defined to start in response to an identified deviant network event and end at a time based on the received precision time signal; and a profile selection module to implement, via the processor, the time-based network operation profile during the precision time window based on the occurrence of the deviant network event and the received precision time signal, wherein the time-based network operation profile enables, during the precision time window, a communication protocol via at least one of the plurality of communication ports that was previously disabled.

2. The software-defined networking device of claim 1, wherein the precision time window of the time-based network operation profile has an end time defined as one of an absolute time, and a time period following the deviant network event.

3. The software-defined networking device of claim 1, wherein the precision time input port is a communication port to receive a signal using one of network time protocol (NTP) and precision time protocol (PTP).

4. The software-defined networking device of claim 1, wherein the time-based network operation profile is defined in terms of changes to another of the plurality of network operation profiles.

5. The software-defined networking device of claim 1, further comprising a controller port to receive communications from a software-defined network (SDN) controller, wherein each of the plurality of network operation profiles, including the time-based network operation profile, is defined by the SDN controller.

6. The software-defined networking device of claim 1, wherein the plurality of communication ports includes one or more of: a DB-25 port, an RS-485 port, an RS-232 port, an Ethernet port, an SFP port, a SONET port, a COM port, an EtherCAT port, a Fiber Channel port, a serial port, and a parallel port.

7. The software-defined networking device of claim 1, wherein each of the plurality of network operation profiles defines network behavior via the plurality of communication ports as the network behavior pertains to one or more of: port forwarding, MAC address handling, network address translation, protocol enablement and disablement, virtual local area network creation, routing, port access control, virtual private network management, and quality of service management.

8. A method of operating a software-defined network (SDN), comprising:
defining, via an SDN, a first network flow to be implemented by a networking device connected as part of an SDN, with a first communication protocol enabled and a second communication protocol disabled;
defining, via the SDN controller, a second, time-based network flow to be implemented by the networking device during a precision time window with the first communication protocol enabled and the second communication protocol enabled, wherein the precision time window is defined in terms of a start time and an end time;
determining a time based on a received precision time input signal;
implementing, by the networking device, the first network flow in response to the determined time not being within the start time and the end time of the precision time window; and
implementing, by the networking device, the second, time-based network flow in response to the determined time being within the start time and the end time of the precision time window.

9. The method of claim 8, further comprising:
disconnecting the SDN controller from the networking device before implementing the second, time-based network flow in response to the determination that the time is within the start time and the end time of the precision time window.

10. The method of claim 8, wherein implementing the second, time-based network flow enables communication between two devices that was previously prevented per the first network flow.

11. The method of claim 8, wherein implementing the second, time-based network flow enables a communication protocol on the SDN that was previously disabled per the first network flow.

12. The method of claim 8, wherein the second, time-based network flow is defined in terms of change to the first network flow.

13. A method of operating a software-defined network (SDN), comprising:
defining, via an SDN controller, a first network flow to be implemented by a networking device connected as part of an SDN with a first communication protocol enabled and a second communication protocol disabled;
defining, via the SDN controller, a second, time-based network flow to be implemented by the networking device during a precision time window with the first communication protocol enabled and the second communication protocol enabled,
wherein a start time of the precision time window corresponds to a deviant network event, and
wherein the second, time-based network flow comprises a time-based flow rule;
implementing the second, time-based network flow in response to a detection of the deviant network event; and
implementing the time-based flow rule of the second, time-based network flow based on a received precision time input signal.

14. The method of claim 13, further comprising:
disconnecting the SDN controller from the networking device before implementing the second, time-based network flow.

15. The method of claim 13, wherein the deviant network event is defined as a communication from a specific first device on the SDN to a specific second device on the SDN.

16. The method of claim 13, wherein prevision time window comprises an end time defined relative to the start time.

17. The method of claim 16, further comprising reverting to implementation of the first network flow after the end time.

18. The method of claim 13, wherein the time-based flow rule is defined with respect to an established network baseline flow.

19. The method of claim 18, wherein the established network baseline flow comprises previously measured network traffic flow during a corresponding time window.

20. The method of claim 18, wherein the established network baseline flow comprises expected network traffic flow based on networking device specifications.

21. The method of claim 18, wherein the established network baseline flow comprises expected network traffic flow based on communication protocol specifications.

* * * * *